(12) United States Patent
Colligan et al.

(10) Patent No.: US 8,135,777 B2
(45) Date of Patent: Mar. 13, 2012

(54) SYSTEM AND METHOD FOR PROVIDING CONTENT TO A MOBILE DEVICE

(75) Inventors: Edward T. Colligan, San Jose, CA (US); David Vadasz, Los Altos, CA (US); Bernard P. Cousineau, Burlingame, CA (US); David D. Daetz, Cupertino, CA (US); Matias G. Duarte, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 12/422,871

(22) Filed: Apr. 13, 2009

(65) Prior Publication Data

US 2010/0159904 A1   Jun. 24, 2010

Related U.S. Application Data

(60) Provisional application No. 61/140,562, filed on Dec. 23, 2008.

(51) Int. Cl.
*G06F 15/16* (2006.01)

(52) U.S. Cl. ........................................ 709/203; 709/219

(58) Field of Classification Search .................... 709/203
See application file for complete search history.

(56) References Cited

U.S. PATENT DOCUMENTS

| | | | |
|---|---|---|---|
| 6,073,075 A | 6/2000 | Kondou et al. | |
| 6,259,405 B1 | 7/2001 | Stewart et al. | |
| 6,310,955 B1 | 10/2001 | Reeves | |
| 6,359,571 B1 | 3/2002 | Endo et al. | |
| 6,397,246 B1 | 5/2002 | Wolfe | |
| 6,456,234 B1 | 9/2002 | Johnson | |
| 6,581,025 B2 | 6/2003 | Lehman | |
| 6,675,204 B2 | 1/2004 | De Boor et al. | |
| 6,782,253 B1 | 8/2004 | Shteyn et al. | |
| 6,795,710 B1 | 9/2004 | Creemer | |
| 6,847,969 B1 | 1/2005 | Mathai et al. | |
| 6,922,567 B1 * | 7/2005 | Rydbeck | 455/456.3 |
| 6,947,976 B1 * | 9/2005 | Devitt et al. | 709/219 |
| 6,961,567 B1 | 11/2005 | Kuhn | |
| 7,103,370 B1 | 9/2006 | Creemer | |
| 7,266,379 B2 | 9/2007 | Blight et al. | |
| 7,536,190 B1 | 5/2009 | Creemer | |
| 2001/0047272 A1 | 11/2001 | Frietas et al. | |
| 2002/0052781 A1 | 5/2002 | Aufricht et al. | |
| 2002/0077118 A1 | 6/2002 | Zellner et al. | |
| 2002/0137530 A1 * | 9/2002 | Karve | 455/466 |

(Continued)

FOREIGN PATENT DOCUMENTS

DE          10228608 A1    1/2004

(Continued)

OTHER PUBLICATIONS

U.S. Appl. No. 60/954,022, filed Aug. 6, 2007, Swift et al.

(Continued)

*Primary Examiner* — Christopher Biagini (57) ABSTRACT

A method of providing content to a mobile device includes accessing data provided by an information management application running on a mobile device using a processing circuit, accessing location data for the mobile device using the processing circuit, and triggering a display of a generic notification using the processing circuit based at least in part on the data provided by the information management application and the location data at a predetermined time.

20 Claims, 3 Drawing Sheets

U.S. PATENT DOCUMENTS

| | | | |
|---|---|---|---|
| 2003/0050046 A1 | 3/2003 | Conneely et al. | |
| 2003/0186722 A1* | 10/2003 | Weiner | 455/558 |
| 2004/0061723 A1* | 4/2004 | Tai et al. | 345/779 |
| 2004/0127198 A1 | 7/2004 | Roskind et al. | |
| 2004/0203643 A1* | 10/2004 | Bhogal et al. | 455/414.1 |
| 2005/0096982 A1* | 5/2005 | Morton et al. | 705/14 |
| 2005/0245241 A1 | 11/2005 | Durand et al. | |
| 2006/0030306 A1 | 2/2006 | Kuhn | |
| 2006/0036490 A1 | 2/2006 | Sagalyn | |
| 2006/0041472 A1 | 2/2006 | Lukose et al. | |
| 2006/0156209 A1* | 7/2006 | Matsuura et al. | 714/798 |
| 2007/0021108 A1* | 1/2007 | Bocking et al. | 455/414.1 |
| 2007/0150825 A1* | 6/2007 | Jachner | 715/765 |
| 2007/0178899 A1 | 8/2007 | Kuhn | |
| 2007/0263863 A1 | 11/2007 | Sakhpara | |
| 2007/0271234 A1 | 11/2007 | Ravikiran | |
| 2008/0032666 A1* | 2/2008 | Hughes et al. | 455/404.1 |
| 2008/0052413 A1 | 2/2008 | Wang et al. | |
| 2008/0132219 A1 | 6/2008 | Bisdikian et al. | |
| 2008/0132252 A1* | 6/2008 | Altman et al. | 455/457 |
| 2008/0160966 A1 | 7/2008 | McKiou et al. | |
| 2008/0195457 A1 | 8/2008 | Sherman et al. | |
| 2008/0291022 A1* | 11/2008 | Amador et al. | 340/572.1 |
| 2009/0006194 A1* | 1/2009 | Sridharan et al. | 705/14 |
| 2009/0076906 A1 | 3/2009 | Kansal et al. | |

FOREIGN PATENT DOCUMENTS

| | | |
|---|---|---|
| EP | 1063837 B1 | 10/2005 |
| EP | 1631050 | 6/2007 |
| WO | WO 2005-071932 A1 | 8/2005 |
| WO | WO 2006/099586 | 9/2006 |

OTHER PUBLICATIONS

Advisory Action for U.S. Appl. No. 09/794,082, mail date Sep. 11, 2009, 4 pages.

Examiner's Answer to Appeal Brief for U.S. Appl. No. 09/794,082, mail date Mar. 24, 2010, 15 pages.

Office Action for U.S. Appl. No. 12/420,743, mail date May 7, 2010, 9 pages.

Office Action for U.S. Appl. No. 12/324,694, mail date Aug. 5, 2010, 10 pages.

International Search Report and Written Opinion for International Application No. PCT/US2009/064940, mail date May 13, 2010, 8 pages.

International Search Report and Written Opinion for International Application No. PCT/US2009/068525, mail date Aug. 5, 2010, 8 pages.

Office Action for U.S. Appl. No. 11/901,272, mail date Aug. 10, 2010, 10 pages.

US Office Action for U.S. Appl. No. 09/794,082, mail date Jun. 25, 2009, 9 pages.

\* cited by examiner

SYSTEM AND METHOD FOR PROVIDING CONTENT TO A MOBILE DEVICE

CROSS-REFERENCE TO RELATED APPLICATIONS

The present application claims priority to U.S. Provisional Application No. 61/140,562, filed Dec. 23, 2008, which is incorporated herein by reference in its entirety.

BACKGROUND

The present disclosure relates generally to the field of mobile devices, and more specifically, to systems and methods for providing advertisement data or other content to a mobile device based on contextual data associated with the mobile device.

Mobile devices may be used to provide advertisements to users of mobile devices. Advertisements may be displayed on a mobile device a user is carrying based upon, for example, the geographic location of the mobile device. For example, if a user walks past a restaurant, an advertisement (e.g., coupon, discount, general advertisement, etc.) may be displayed on the user's mobile device.

It would be desirable to provide an improved system and method for providing content to mobile devices.

BRIEF DESCRIPTION

DETAILED DESCRIPTION

Figure 1:
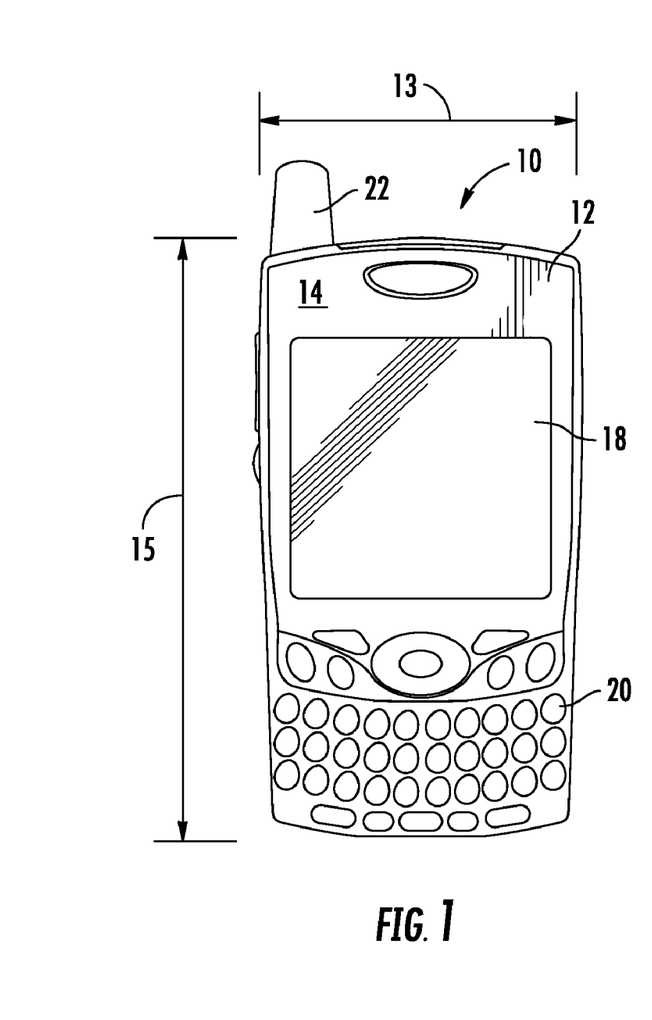
FIG. 1 is a front view of a mobile device according to an exemplary embodiment.
Figure 2:
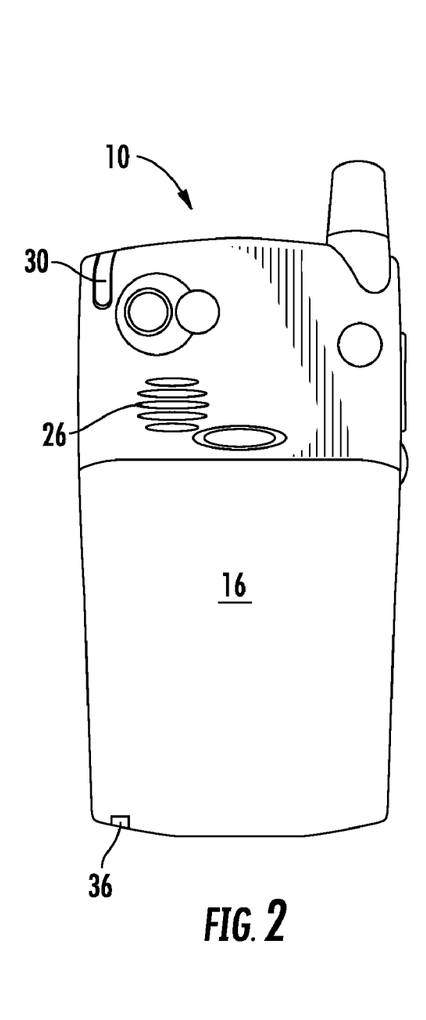
FIG. 2 is a back view of the mobile device of FIG. 1 according to an exemplary embodiment.
Figure 3:
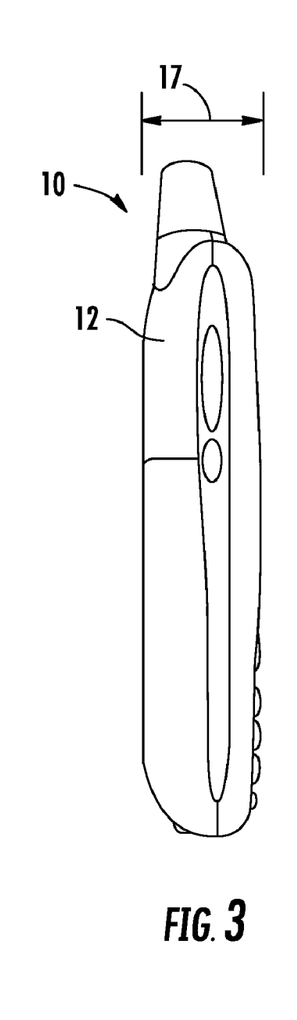
FIG. 3 is a side view of the mobile device of FIG. 1 according to an exemplary embodiment.

Referring to FIGS. 1-3, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 may be a smartphone, which is a combination mobile telephone and handheld computer having PDA functionality. PDA functionality can comprise one or more of personal information management (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 may comprise a touch screen display in order to provide user input to a processor 40 (see FIG. 4) to control functions, such as to select options displayed on display 18, enter text input to device 10, or enter other types of input. Display 18 also provides images (see, e.g., FIG. 7) that are displayed and may be viewed by users of device 10. User input device 20 can provide similar inputs as those of touch screen display 18. Device 10 can further comprise a speaker 26, and a stylus 30 to assist the user in making selections on display 18. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies, and so on. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment.

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 1, the rear surface shown in FIG. 2, the side surfaces as shown in FIG. 3, etc.). Furthermore, various components such as a keyboard etc. may be retractable to slide in and out from a portion of device 10 to be revealed along any of the sides of device 10, etc.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Figure 4:
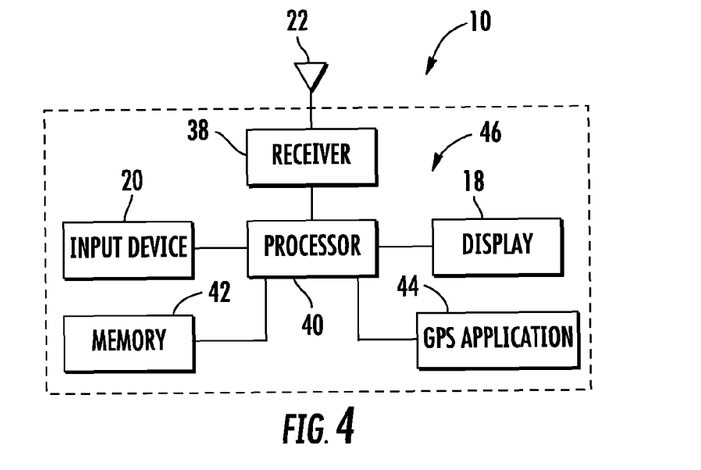
FIG. 4 is a block diagram of the mobile device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 may comprise one or more memories (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor may be configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA) techniques, Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), triangulation techniques such as Wi-Fi triangulation techniques, and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Device 10 further comprises a memory 42 coupled to or as part of processor 40. Memory 42 may store a variety of data (e.g., context data, etc.) such as information, data, applications, files, etc. that may be used or accessed using device 10. For example, calendar data may include data regarding various appointments such as location data (e.g., an individual's residence, a commercial establishment, an address or other geographic indicator such as a city, state, etc., a conference room number, and so on), time/date data (e.g., a date and/or time for a specific appointment, data regarding a recurring appointment, etc.), attendee data, and other data related to an appoint or meeting. Contacts data may include information regarding specific contacts, such as names, addresses, phone numbers, email addresses, fax numbers, and contact-specific notes (e.g., notes about the specific contact such as a birthday, anniversary, etc.). Messaging data may include information related to a variety of messaging applications including email, text messaging, short message service (SMS), and so on. According to various other exemplary embodiments, device 10 may utilize other context data in accordance with the various embodiments disclosed herein (e.g., data related to web-sites the user has visited using device 10, bookmarks or favorites for web-sites, data downloaded from a user's social networking account on a web-site (e.g., a MySpace or Facebook account), data related to audio and/or video clips (e.g., songs, videos, etc.), to-do lists, memo applications, gaming applications, etc.). The present disclosure is intended to be applicable to all such embodiments.

Figure 5:
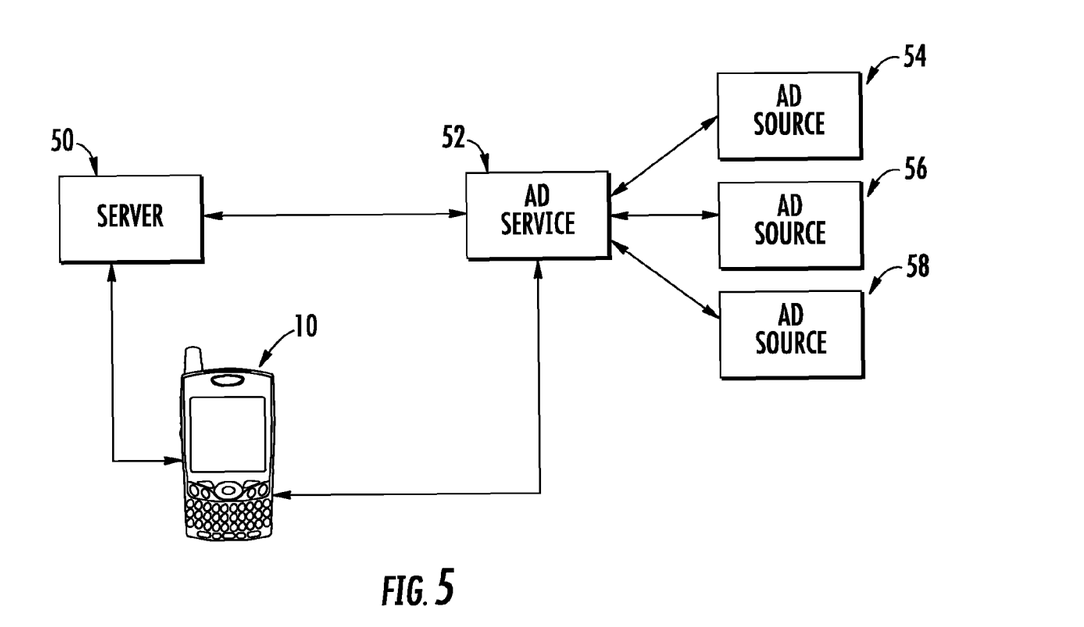
FIG. 5 is a block diagram of a system for providing content to a mobile device according to an exemplary embodiment.

Referring now to FIG. 5, device 10 may be configured to receive and provide content (e.g., generic alerts or notifications, general inquiries, advertisement data, selectable links, icons, etc., and so on) to users. As shown in FIG. 5, device 10 may communicate with servers 50, 52, which may in turn communicate with one or more advertisement sources 54, 56, 58 (e.g., ad sources such as retailers, restaurants, services, etc.). According to an exemplary embodiment, server 52 may be an advertisement service configured to provide advertisement data (e.g., visual advertisements, audible advertisements, e-coupons, etc.) from ad sources 54, 56, 58 to device 10 (either in coordination with, or independent from, servers 48, 50, as discussed in further detail below). Server 50 may be a server associated with an application developer that provides applications to be run on or provided to device 10. Alternatively, server 50 and/or server 52 may be a server associated with a manufacturer of device 10. In some embodiments, sources 54, 56, 58 may provide advertisement data to device 10 without utilizing servers 50, 52 (e.g., such that the advertisement data is received by processor 40 of device 10 from sources 54, 56, 58).

According to various exemplary embodiments, the advertisement data or content may include a variety of information and be provided in a variety of ways. For example, content may be provided to a user of device 10 in the form of a visual image provided on display 18. For example, an icon may be displayed on device 10 and may be selected by a user to provide an enlarged advertisement such as an electronic coupon, etc. Alternatively, rather than providing a visual display, device 10 may provide an audible message (e.g., a recording of an advertisement, etc.). Furthermore, advertisement data may be provided on display 18 and superimposed over another image, such as the current image the user is viewing, a geographic map indicating the location of the establishment(s) the advertisement data is associated with, and so on. Further yet, the content may include or be non-advertisement data such as general point-of-interest data, appointment data, etc. According to various other exemplary embodiments, other types of content or advertisement data may be provided to device 10 (e.g., text, graphics, audio data, video data, etc.).

According to various exemplary embodiments, one or more of servers 50, 52 may be involved in providing content or advertisement data to device 10. For example, in one embodiment, server 52 may be associated with an advertisement service (e.g., AdSense, provided by Google, Inc., Mountain View, Calif.) and be configured to provide advertisement data to device 10 independent from server 50. For example, as shown in FIG. 5, server 52 may communicate with device 10 and with one or more of ad sources 54, 56, 58. Ad sources 54, 56, 58 may provide advertisement data to server 52, which may in turn provide the advertisement data to mobile device 10. In one example, server 52 may provide the advertisement data based at least in part on certain criteria or data (e.g., to act as a filter to provide advertisement data having higher relevance to a user), such as a location of device 10, historical data associated with the usage of device 10 (e.g., web browsing history, location history), user-specific data (data stored in an information management application such as an email application, calendar application, contacts application, and so on), or some other criteria or data. Such criteria or data may be defined by a user and the access to such criteria or data for filtering or otherwise providing advertisement data and other content to device 10 may be limited by a user or other entity. In some embodiments, server 52 may permit various ad sources (e.g., ad sources 54, 56, 58) to register with server 52 in order to have their advertisement data provided to users (e.g., a user of device 10). Based on certain criteria or data, the advertisement data may then be selected for delivery to various devices/users.

According to other embodiments, server 52 may be configured to provide advertisement data or other content to device 10 in conjunction with or through server 50. For example, as noted above, server 50 may be or include a server associated with an application developer that provides applications (e.g., mobile device-specific applications, such as games, financial tools, location-based mapping programs, music players, etc.) to device 10. Advertisement data may be provided to (by one or more of servers 50, 52) and/or displayed on device 10 while one or more applications provided by server 50 are running on device 10. For example, one or more advertisements provided by server 52 may be displayed along a top, side, or bottom portion of display 18 while a user is running an application provided by server 50.

In some embodiments, server 50 may be a server associated with a manufacturer of device 10, and may have wireless or other access to data unavailable to server 52 (e.g., user-specific data such as data from an information management application, including email, calendar, contacts, and other applications). Server 50 may provide data associated with device 10 (and/or the associated user) to server 52. Such data may be used, for example, to filter advertisement data or other content being provided to device 10 to increase the relevancy of the advertisement data to the particular device/user. It should be understood that the various embodiments discussed herein are provided for purposes of illustration only, and that more or fewer servers or other parties/entities may be involved in the provision of advertisement data or other content to device 10. All such embodiments are deemed to be within the scope of the present disclosure.

Referring now to FIGS. 6-9, content may be provided to device 10 based on context data or other information that may indicate where a user is, what the user is/will/has been doing, and so on. Context data may generally refer to data associated with the context of device 10 or a user thereof, and may include historical data (e.g., data associated with past usage patterns of device 10 such as movement of the device, locations of the device, messaging data, web browsing activity, transactions executed using device 10, etc.), data associated with the current state of device 10 (e.g., mobile-specific inputs such as a current location, direction of travel, speed/acceleration of movement, etc., a current time of day, date, etc.), data associated with an information management application (e.g., an email or other messaging application, a calendar application, a contacts application, and so on), or other data accessible by or otherwise associated with device 10 or a user thereof (e.g., data associated with mobile devices or users of mobile devices that are included in a contact listing, social networking group, listing, category, etc., other mobile-specific inputs, and so on). Context data may in some embodiments generally refer to any type of data or information that may be used to determine a user's context, and may include or indicate usage patterns of device 10 such as on/off patterns (e.g., a pattern of higher of usage (e.g., times of day during which device 10 is typically on or off, etc.), web browsing (e.g., web sites visited, etc.), location/movement history (e.g., modes of travel, locations visited, etc.), and so on.

As an example, device 10 may access data indicating a planned/future destination (e.g., location) of a user (e.g., as indicated by a calendar or other information management application) in addition to the user's current location, and provide the user with data regarding nearby points of interest (e.g., hours of operation, whether open/closed, etc.) or other establishments. Similarly, device 10 may access data indicating that the user is outside of a particular geographic area (e.g., outside a certain distance from a home location, a work location, etc., outside an area code of a mobile phone number associated with device 10, outside of an address contained in a contacts application, and so on), and/or data indicating that a user has recently moved locations (e.g., as a result of travelling via plane, train, etc.), and trigger the delivery of content based on the user's location and/or on a time-sensitive basis (e.g., based on departure times, arrival times, etc.).

Device 10 may further access data indicating that a user has "free time" (e.g., as indicated by an appointment calendar or other application) and provide content regarding points of interest or establishments in the vicinity of the user (or similarly, on or near a route between the user and a location associated with one or more scheduled appointments). As an additional example, should the user be waiting for a bus, train, plane, etc., or some other type of public or other transportation, device 10 may provide time-sensitive offers for nearby establishments to the user based on, for example, the user's available time prior to a scheduled departure time.

As indicated above, device 10 may be configured to provide (e.g., deliver, trigger or initiate the delivery of, filter, etc.) content based on context data. According to some embodiments, the content may be provided in the form of a generic alert or notification (e.g., "Are you hungry?", "Do you want to listen to music?", "Would you like to try a new restaurant?", "Would you like to visit one of your favorite restaurants?", "Do you want to send an invite out to your friends?", etc.) that when selected, directs a user to more specific data or information (e.g., "Lunch Special at Sam's Deli today", etc.).

Other examples of generic content may include content offering the best price for a certain item or service (e.g., "Looking for the best price for gas near you?"), or similarly, content offering to locate a preferred vendor, point of interest, etc., such as a gas station, fast food restaurant, coffee shop, etc. that, based on a user's current location, a given mode of transportation, and/or the hours of operation of the vendor or establishment, will still be open when the user arrives (e.g., "Looking for the nearest gas station?"). Other generic alerts may include offers to locate ATM machines or other computer terminal or user terminals (e.g., taking into account any additional fees charged by the ATM), public parking (e.g., taking into account hours of operation, pricing, etc.), lodging (e.g., taking into account vacancy, room rates, and other data regarding hotels, etc.), and so on. Various other types of generic alerts may be provided that take into account a wide variety of context data and other data (e.g., metadata associated with various establishments, etc.) in order to increase the relevancy of the content to users.

According to various alternative embodiments, context data may be stored in a variety of ways and utilizing a variety of storage devices and systems, such as in memory of a mobile device such as device 10, using one or more servers that are separate from device 10, using one or more servers that are associated with an ad service, an ad sponsor (e.g., a retailer, etc.), via a data storage system accessible via the Internet or another network system, and so on. Other suitable means of storing context data may be used according various other embodiments.

Figure 6:
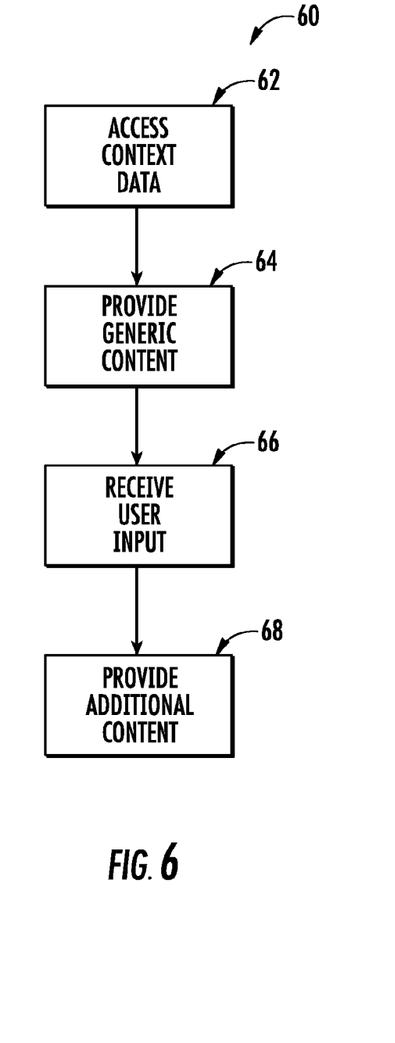
FIG. 6 is a flow chart of a method of providing content to a mobile device according to an exemplary embodiment.

Referring to FIG. 6, a method of providing content to a user is illustrated according to an exemplary embodiment. First, context data may be accessed (e.g., retrieved, monitored, stored, etc.) (step 62). Accessing context data may be done by processor 40, servers 50, 52, or a combination thereof. As discussed above, accessing context data may include accessing or monitoring a wide variety of data either stored on device 10 or otherwise accessible by device 10.

Based upon the context data, content may be provided to device 10 (step 64). According to an exemplary embodiment, the content is provided in a generic format (e.g., as a generic notification or alert, etc.) and is not tied to any particular entity such as ad sources 54, 56, 58, etc. The content may include a selectable link such that an input (e.g., a selection of the link) may be received by device 10 (step 66) in response to the content being provided. Upon receipt of the input, additional content may be provided to a user (e.g., more specific data, advertisement data, driving or other directions, etc.) (step 68). The additional content may include, for example, advertisement data from ad sources 54, 56, 58, point of interest information (e.g., non-advertisement data or information about specific destinations, which may be in proximity to device 10 or in some other predetermined geographic location(s), a website, and so on).

It should be understood that the method illustrated in FIG. 6 is widely applicable to various types of context data. Utilizing context data takes into consideration a user's context in triggering content such as generic notifications, advertisement data, and other content, and may enhance the quality of the content provided to users by increasing the relevancy of the content to the user in accordance with the user's context (e.g., location, current appointments, historical usage patterns, etc.).

In some embodiments, content may be provided based on time data and/or data from a personal information management application such as a calendar application. For example, at a predetermined time (e.g., a typical meal time such as lunch time, etc., a user-configurable time, a pre-set time, etc.), calendar data associated with device 10 may be accessed to determine, for example, whether a user has an appointment scheduled (e.g., a lunch appointment). If the user has no appointment scheduled, device 10 may be configured to provide the user with content such as a generic alert or notification (e.g., "Are you hungry?", "Do you want to go out to eat?", etc.). The notification may include a selectable link or be otherwise selectable (e.g., via a touch screen or other input device), such that should the user select, for example, a link provided with the generic notification, device 10 may then provide more specific, additional content or information. The additional content may be any of a wide variety of content, including targeted advertisements (e.g., ads, e-coupons, discounts, etc. selected based on past user behavior, the location of the user, user-configurable preference data, etc.), an option to send out a notification to other users or mobile devices (e.g., an option to send out a lunch invitation to other mobile devices identified via a contacts application, a social networking application or listing, the location(s) of other users/devices, etc.), and so on. The process of providing progressively more specific data to device 10 in response to continued responses or other user inputs may be repeated as part of providing content to device 10.

In some embodiments, content may be provided based upon the movement and/or location of device 10. For example, device 10 may be configured to, for example, determine when a user has left a building or similar environment, which may in turn trigger the delivery of content to the user (e.g., "Need directions?", etc.). In order to provide content with greater relevancy, device 10 may further take into account a direction of travel (e.g., via an integrated compass, etc.), a speed of travel (e.g., via a GPS system, accelerometer, etc.), and so on. For example, the content provided to the user may vary based on what points of interest are in the general direction of travel of device 10, based on a predicted mode of travel (e.g., walking, driving, etc.) determined based upon the speed of travel, based on calendar appointment data (e.g., by knowing where a user may be going based upon appointment data), and so on.

In some embodiments, content may be provided to additional devices based on inputs associated with, or content provided to, device 10. For example, content such as an advertisement may be provided to a user via display 18 of device 10. A user may select the advertisement in order to navigate to, for example, a web site hosted by the source of the advertisement. In response to the user selecting the advertisement, additional content may automatically be provided to additional devices (e.g., additional mobile devices identified in a social network listing, etc.). For example, should a user select a particular advertisement, the same or a similar advertisement may be provided to a group of users that are in a contacts application of the user, users that may be identified based upon some type of social networking grouping or listing (e.g., via being identified as "friends," contacts," etc. as part of an application or web-based service such as Facebook, MySpace, etc. (or a list of contacts having a particular designation on such a service)), users that may be designated, flagged or somehow identified by a user and stored on device 10 and/or a server, etc., and so on. Various other means of identifying a social network listing may be used, and the listings may overlap or may be mutually exclusive, etc. For example, social network listings may include email listings (e.g., personal or professional listings or groups, such as a marketing group of a business, a sales team, etc.) a class list for a particular academic institution and/or year, a sports team (e.g., a school and/or youth sports team, etc.) and/or other social network listings that may be more or less permanent/temporary in nature.

Figure 7:
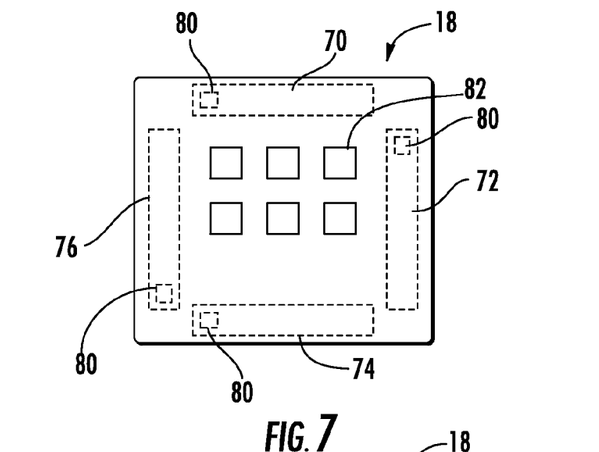
FIG. 7 is a front view of a display of a mobile device according to an exemplary embodiment.
Figure 8:
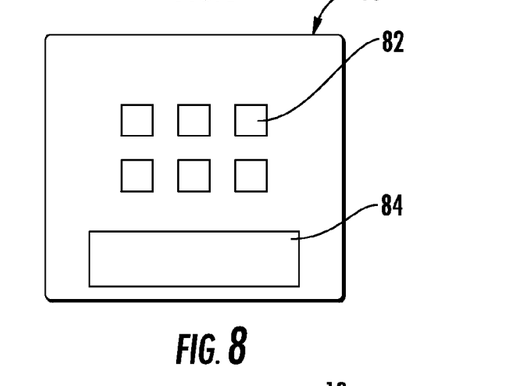
FIG. 8 is a front view of a display of a mobile device according to an exemplary embodiment.
Figure 9:
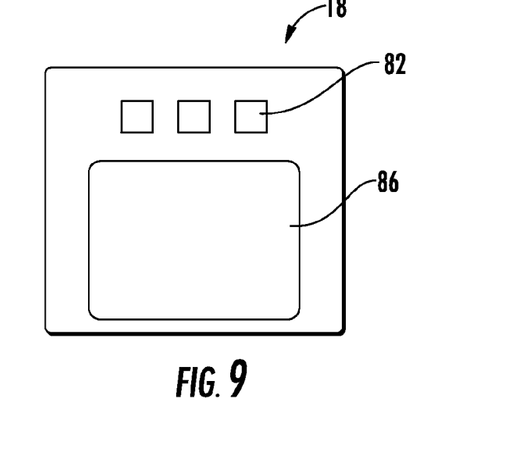
FIG. 9 is a front view of a display of a mobile device according to an exemplary embodiment.

Referring to FIGS. 7-9, display 18 is shown according to various exemplary embodiments as including content provided to a user. Referring to FIG. 7, content such as generic notifications, advertisement data, etc., may include or be provided in the form of a selectable link or identifier 80 (e.g., an icon, selectable text or graphics, etc.). Link 80 may be an icon with a graphical representation intended to convey a message to a user (e.g., such as an icon with a graphical representation of a map that is associated with driving directions, etc., and so on). Icon 80 may be sized such that it is relatively smaller than one or more other icons or identifiers (e.g., icons or other identifiers associated with applications, files, etc. available to device 10) provided on display 18 in order to provide content to users in an unobtrusive manner. Furthermore, icon 80 may be provided as part of a status or notification bar or area 74 on display 18. As shown in FIG. 7, the content or icon and notification or status bar may be provided in any of wide variety of locations on display 18, including a bottom portion (see icon 80 and notification bar 74), a side portion (see notification bars 72, 76), or a top portion (see notification bar 70). In some embodiments, an application developer (e.g., a developer associated with one of servers 50, 52) may be permitted to feed or provide advertisements or other data to a notification bar displayed on device 10, or alternatively, to have advertisements or other content embedded within the area of the display being used by one or more applications. According to various exemplary embodiments, icon 80 may be provided in other areas or portions than those shown in FIG. 7.

Referring to FIG. 8, should a user select icon 80, the user may be provided with additional content 84. Additional content 84 may include a generic notification or message, advertisement data from an ad source (e.g., one or more of ad sources 54, 56, 58, etc.), non-advertisement data, etc. For example, icon 80 may include a representation of a map. Upon clicking on the map, a user may be provided with additional content 84, which may include a generic notification or question such as "Do you need directions?". Additional content 84 may include a selectable link that enables a user to select additional content 84. Upon a user selecting additional content 84, the user may be provided with yet further content 86. For example, content 86 may include driving directions, a list of popular destinations for a user (which may be selectable to provide even further content), and so on.

As shown in FIGS. 7-9, as a user continues to provide inputs (e.g., selecting content provided to device 10), the content provided may continue to increase in size or prominence (e.g., as shown with the increasing relative sizes of icon 80, additional content 84, and content 86). Furthermore, the amount of content provided may increase as a user continues to engage the content provided. Further yet, the specificity of the content may increase as a user becomes more engaged (e.g., from generic to greater levels of specificity).

According to various exemplary embodiments, as a user continues to engage the content provided to device 10, a user may be permitted to interact (e.g., enter into transactions, make reservations, provide and/or receive contact information, etc.) with various entities associated with the content provided to device 10. For example, as a user selects additional content (e.g., additional content such as additional content 84 shown in FIG. 8), a user may be permitted to, for example, make dinner reservations (including automatically making an appointment in a calendar application), enter into transactions such as paying for a dinner, etc., exchange contact data with ad sources and other entities, and so on.

The systems and methods described herein may be implemented to provide data to a wide variety of mobile devices that may take a wide variety of forms (e.g., differing form functions, etc.) and have a wide variety of functional capabilities such as visual display capabilities, input/output capabilities (e.g., touch screen, non-touch screen devices, etc.), audible output capabilities, etc. In some embodiments, the content provided to device 10 may be formatted based on the characteristics or capabilities of device 10. Alternatively, device 10 may be configured to receive the content and perform such formatting based on data stored on device 10, accessible via device 10, provided as part of the content itself (e.g., as embedded data or formatting instructions) and so on. The formatting may further be performed for a wide variety of devices (e.g., a handheld device, a relatively smaller-sized device such as a watch, etc., a relatively larger-sized device such as a television, etc.), and so on.

In some embodiments, device 10 may be configured to provide and/or format content such as advertisements etc. as sessions change (e.g., as an application moves through different modes or states such as downloading, launch, a ready/usage state, ending/shut-down, etc.). For example, a user may download an application to device 10, during which content may be provided in the form of, for example, dynamic and/or static ads, sponsorships, etc. When the application is launched an initial "splash screen" (e.g., a screen or page provided to the user while an application is launched) may be displayed that includes content such as advertisements, etc., and as the application transitions to a "ready" state (e.g., ready to be used by the user), one or more interstitial pages may be provided with further content. Similar content may be provided as the application is closed or shut down.

In some embodiments, while an application is in use, or active, certain display portions or areas may be dedicated to content such as advertisements on a permanent or temporary basis. Alternatively, device 10 may provide users with alerts or other notifications that include relevant content such as advertising or other data. Further, for applications having searching capabilities, content such as sponsored links or logos, etc. may be provided in connection with various search queries. Further yet, certain content provided by device 10 may include brand information such as logos, etc.

It should be understood that the various systems and methods described herein may be implemented on or via device 10, via one or more of servers 50, 52 (e.g., a server associated with an ad service, etc.), or via other devices/components and any combination(s) thereof, and all such combinations are deemed to be within the scope of the present disclosure. One or more of device 10 and/or servers 50, 52 may serve as a "content manager" or "offer manager" to manage, trigger, filter, and/or otherwise control the delivery of content (e.g., advertisements, offers, etc.) to device 10.

Various embodiments disclosed herein may include or be implemented in connection with computer-readable media configured to store machine-executable instructions therein, and/or one or more modules, circuits, units, or other elements that may comprise analog and/or digital circuit components configured or arranged to perform one or more of the steps recited herein. By way of example, computer-readable media may include RAM, ROM, CD-ROM, or other optical disk storage, magnetic disk storage, or any other medium capable of storing and providing access to desired machine-executable instructions.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A method for providing content to a mobile device, the method being performed by one or more servers and comprising:
    accessing data provided by at least one information management application running on the mobile device;
    accessing location data of the mobile device, the location data identifying a location of the mobile device;
    selecting, from a plurality of content data provided by a plurality of content sources, content data provided by a first content source, based, at least in part, on the data provided by the at least one information management application and the location data; and
    communicating with the mobile device to cause a generic notification to be presented on a display of the mobile device at a predetermined time, wherein the generic notification (i) is based, at least in part, on the selected content data, and (ii) provides information that is not specific to the first content source;
    wherein the data provided by the at least one information management application includes data from at least one calendar appointment; and
    wherein the generic notification is provided based, at least in part, on historical usage data of the mobile device stored in a memory of the mobile device, the historical usage data being accessed by the one or more servers.

2. The method of claim 1, wherein the data provided by the at least one information management application includes data from at least one contact entry.

3. The method of claim 1, wherein the location data indicates at least one of an anticipated location and a current location of the mobile device.

4. The method of claim 1, wherein the generic notification includes a selectable link to additional data.

5. The method of claim 4, wherein the additional data includes advertisement data selected based, at least in part, on the data provided by the at least one information management application and the location data.

6. The method of claim 1, wherein the generic notification is provided in a status area of the display of the mobile device and is represented by an identifier that is smaller than a plurality of other identifiers representing applications available to the mobile device.

7. The method of claim 1, wherein the predetermined time is configurable by a user.

8. The method of claim 1, further comprising:
    providing a generic notification to at least one other mobile device based, at least in part, on the data provided by the at least one information management application and the location data.

9. The method of claim 8, wherein the at least one other mobile device is identified from at least one of a contacts application and a social network listing stored on the mobile device.

10. The method of claim 1, further comprising:
    formatting the generic notification based, at least in part, on characteristics of the mobile device.

11. A system for providing content to mobile devices, the system comprising:
    at least one server comprising one or more processors, the at least one server configured to:
        access data provided by at least one information management application running on a first mobile device and location data of the first mobile device, wherein the location data identifies a location of the first mobile device;
        select, from a plurality of content data provided by a plurality of content sources, content data provided by a first content source corresponding to a first content based, at least in part, on the data provided by the at least one information management application running on the first device and the location data;
        provide a generic notification that is based, at least in part, on the content data corresponding to the first content to the first mobile device, the generic notification providing information that is not specific to the first content source;
        receive an input associated with the first mobile device based, at least in part, on the first content; and
        provide second content to at least one second mobile device based, at least in part, on the input received;
    wherein the data provided by the at least one information management application includes data from at least one calendar appointment; and
    wherein the generic notification is provided based, at least in part, on historical usage data of the first mobile device stored in a memory of the mobile device, the historical usage data being accessed by the at least one server.

12. The system of claim 11,
    wherein the first content includes advertisement data, the advertisement data including a selectable link to additional data; and
    wherein the input comprises a selection of the selectable link.

13. The system of claim 12, wherein the second content comprises advertisement data associated with the first content.

14. The system of claim 11, wherein the at least one server is further configured to identify the at least one second mobile device based, at least in part, on accessing data stored on the first device.

15. The system of claim 14, wherein the data stored on the first mobile device includes at least one of data from a contact application, data from a social network list, and data from an email application.

16. The system of claim 11, wherein the first content includes an indicator provided in a status area of a display of the first mobile device.

17. A method for providing content to a mobile device, the method being performed by one or more servers and comprising:
    accessing historical data from a first memory of the mobile device, the historical data including data associated with a user's pattern of use of the mobile device;
    accessing location data of the mobile device from a second memory, the location data corresponding to a location of the mobile device;
    selecting, from a plurality of content data provided by a plurality of content sources, content data from a first content source, based, at least in part, on the historical data and the location data; and
    communicating with the mobile device to cause a generic notification to be presented on a display of the mobile device, wherein the generic notification (i) is based, at least in part, on the selected content data, and (ii) provides information that is not specific to the first content source;
    wherein the generic notification is provided based, at least in part, on data, accessed by the one or more servers, from at least one calendar appointment and provided by an information management application running on the mobile device.

18. The method of claim 17, wherein the generic notification is selectable by the user to in order to provide the user with additional content.

19. The method of claim 18, wherein the generic notification is provided in a status area of the display of the mobile device.

20. The method of claim 17, wherein the user's pattern of use indicates a pattern of at least one of device usage, messaging, web browsing, device locations, and device movement.

* * * * *